Feb. 11, 1964  C. A. VOSSBERG  3,121,166
X-RAY APPARATUS FOR MEASURING PAPER WEB DENSITY
Filed Oct. 20, 1960  2 Sheets-Sheet 1

INVENTOR
Carl A. Vossberg

BY *Kenyon, Palmer & Stewart*
ATTORNEY

Feb. 11, 1964    C. A. VOSSBERG    3,121,166
X-RAY APPARATUS FOR MEASURING PAPER WEB DENSITY
Filed Oct. 20, 1960    2 Sheets-Sheet 2

INVENTOR
Carl A. Vossberg

BY Kenyon, Palmer + Stewart
ATTORNEY

United States Patent Office 3,121,166
Patented Feb. 11, 1964

3,121,166
X-RAY APPARATUS FOR MEASURING PAPER
WEB DENSITY
Carl A. Vossberg, P.O. Box M, Umatilla, Fla.
Filed Oct. 20, 1960, Ser. No. 63,848
9 Claims. (Cl. 250—83.3)

This invention relates to measuring systems and more particularly to an apparatus employing a source of radiation such as an X-ray tube and the determination of physical characteristics of materials by directing the radiation therethrough. In general, the system may be used for determining the thickness of a specimen even though its composition may vary, or determining the alloy content, or measuring the percentage of moisture in various materials, and the like. The measurement is effected without requiring physical contact with the specimen or material.

The measurement of thickness with X-rays has been known and practiced for some time. For examples, see my Patents Nos. 2,549,402; 2,632,117; 2,823,319; and 2,901,630; Fua and Woods, 2,525,292; Clapp, 2,467,812; Lundahl, 2,669,662 and 2,565,734. In general, these systems measure in some means the absorption characteristics of the material under measurement. By assuming the density and composition as relatively constant, the absorption is related to the thickness for a given X-ray's quality. Thus, the intensity of the penetrated beam is a measure of the thickness, all other factors remaining constant. Devices utilizing beta rays, or other isotopic radiation as the source, similarly determine thickness by observing the resultant penetrated radiation.

The major difficulty with such prior art systems is that they are dependent on uniform composition of the specimen being tested. Whenever there is a change in composition of the test specimen, then the thickness indication is incorrect.

Accordingly, it is the principal object of the present invention to provide for example a non-contacting thickness gauge which, independent of composition changes of a test specimen, will continue to indicate correct thickness.

A further object of the invention is to provide an apparatus for example, for measuring the contents of a series of sealed cans, which is independent of variation in thickness of the can lids and which may be on a volumetric or mass basis.

Further objects and advantages of the invention will be apparent from the following detailed description when read in conjunction with the attached sheets of drawing in which.

In general, the objects of the present invention are achieved by alternately irradiating a specimen with at least two radiations which can both be X-rays of different hardness or can be X-rays and beta rays or gamma rays or other isotopic radiation. By synchronously measuring the radiation from the sources after it has passed through the specimen, it is possible so to calibrate an indicating instrument as to read correctly the desired physical characteristic (thickness, fullness etc.) irrespective of variations in composition of specimens, the thickness of which is desired or of container wall variations in sealed containers, the contents of which is to be measured. Many uses of the apparatus will occur to those skilled in this art. To mention only a few, the moisture content of a specimen, such for example as a paper web, the composition of an alloy, and the thickness of a test specimen, regardless of variations in composition, are all possible and intended to be included within the scope of the claims.

Figure 1:
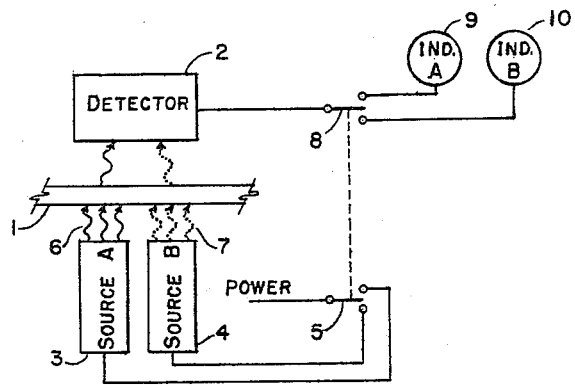
FIG. 1 is a diagrammatic representation of a simplified form of my invention.

Referring first to FIG. 1, the specimen 1 whose characteristic is to be measured is interposed between a detector 2 and a radiation source shown for convenience as dual sources 3, 4. The radiation sources may generate different X-rays, or may comprise dissimilar radiations such as beta rays and X-rays, or beta rays and gamma rays, or different light sources, or combinations of radiations such that the specimen characteristics will affect the dual radiations in a different manner. In some instances, more than two types may be desirable. For illustration, assume radiation A, 3 to comprise a source of X-rays and radiation B, 4 a source of beta rays and that these sources are activated alternately as shown diagrammatically by switch 5 although this could be accomplished instead by a mechanical shutter interposed in the beams to allow either beam 6 or beam 7 to pass alternately onto the specimen.

Synchronized with switch 5 is switch 8 to couple alternately indicator A, 9 or indicator B, 10 representing means for measuring correspondingly the penetrated signal from source A and source B. FIG. 1 is a line functional drawing and it is obvious that actually additional electrical connections will be required.

The transmitted radiations 6 and 7 can be such that for given characteristics of specimen 1 the indicators 9 and 10 will read the same. As the characteristics of specimen 1 change, for example the composition, the indicators will read differently and this relative difference can be calibrated to measure the change of the specimen characteristics. For instance, moisture (water) affects the absorption of beta rays relatively more than the absorption of low voltage X-rays. Hence, additional moisture will cause a greater deviation on the beta ray indicator.

Figure 2:
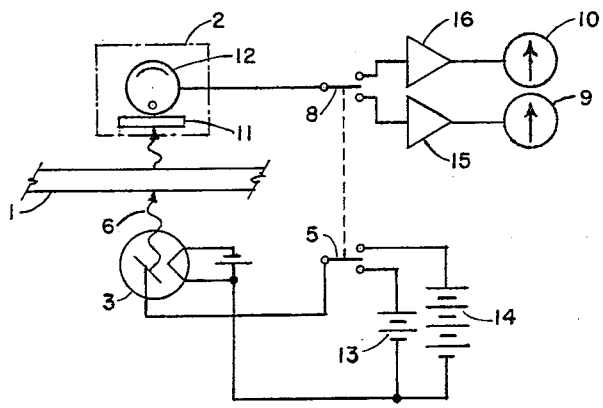
FIG. 2 shows another configuration, specifically using an X-ray tube as the source of radiation.

More specifically, there is next described a system utilizing only X-rays but of varying intensitions. Referring to FIG. 2, specimen 1 may be a paper web whose moisture content and density are to be measured. X-rays 6 penetrate the specimen and the resultant intensity is measured by detector 2 comprising a fluorescent screen 11 and a phototube 12 which may advantageously be of the multiplier phototube type. The details will be omitted because similar circuitry and description are given in the previously cited patents.

The intensity of the X-ray beam 6, generated by X-ray tube 3, is a function of the X-ray tube voltage shown as either of two voltages 13 or 14 depending on the position of switch 5. Assume voltage 14 is higher than 13. Coupled to switch 5 is switch 8 such that amplifier 15 is connected when voltage 13 is applied to X-ray tube 3 and amplifier 16 is connected when voltage 14 is applied. The amplification gain of 15 is set to deliver a given output to meter 9 and the gain of 16 is set to deliver the same output reading to meter 10 for a known condition of specimen 1. That is to say, the gain of 15 is more than that of 16 to make up for the decreased X-ray beam when 15 is connected.

Figure 3:
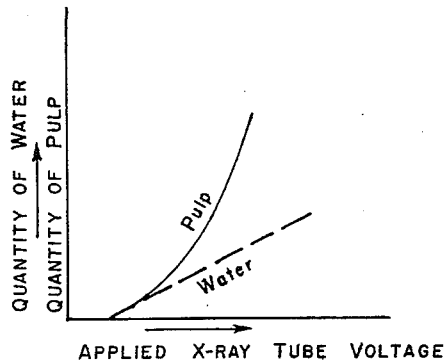
FIG. 3 is a plot of the variation of material with the applied X-ray tube voltage to produce the same penetrated signal output.

Over a range of X-ray tube voltage the plot of penetration for a given signal output may appear as shown in FIG. 3, for paper pulp as against that for water. It will be observed that for equal increments of X-ray voltage the relative absorption varies between pulp and water, the higher the X-ray voltage the denser water appears relative to pulp. In effect, indicator 10 shows first order effects of water changes while indicator 9 shows first order effects of pulp changes.

Figure 4:
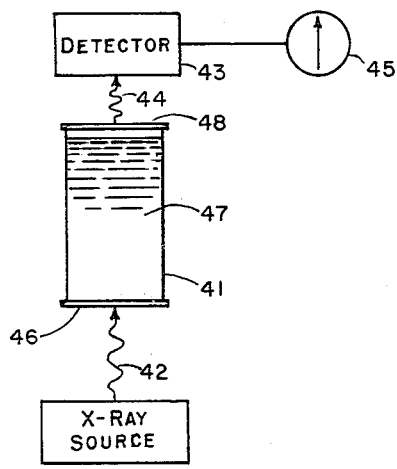
FIG. 4 is a diagrammatic presentation of an embodiment of my invention for determining the quantity of fill within a can.

An interesting application of the present invention is the determination of can fill after the can has been closed, where it is desired to measure the contents, ignoring the effects of lid thickness variations. FIG. 4 shows a can of, say, orange concentrate 41 interposed lengthwise in the X-ray beam 42, detector 43 measuring the resultant penetrated beam 44 and quantitatively giving the reading on the indicator 45. The intensity of the penetrated beam 44 is dependent on the original beam 42, the absorption due to the bottom lid 46 of the can, the orange concentrate 47, and the lid top 48. The thickness variation of the lids can vary generally plus and minus 5% and frequently higher. Without compensation such effects would mask variations in the can contents.

Figure 5:
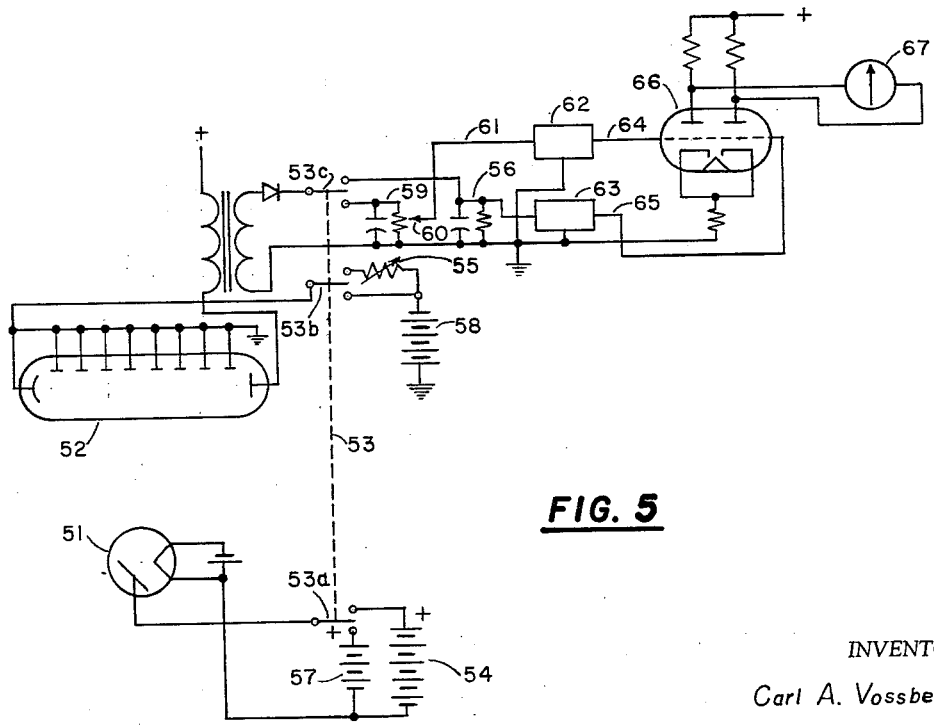
FIG. 5 is a simplified schematic of a system for measuring the can fill or independent characteristics of a test specimen.

FIG. 5 is a simplified schematic of a can fill instrument which does not suffer from the drawbacks mentioned with respect to FIG. 4. The X-ray tube 51 produces X-rays and a multiplier phototube 52 is shown as a detector. Again, a multipole switch 53 sets up alternately one of two conditions of X-rays at 53a, one of two phototube gains at 53b and separates the two signals at 53c. It is apparent that while a switch—or relay or converter—is shown, electronic means could be used to vary the X-ray intensity, the phototube (or amplifier) gain, and gate (or discriminate) the detected signal into two channels. Such systems are well known and will not be described here.

When the switch 53 is in the upper position, more X-rays are generated by virtue of higher supply voltage 54, the phototube has less gain because of resistance 55 and the output signal is passed on to channel line 56. In the lower position switch 53 connects lower X-ray voltage supply 57, greater phototube gain 58, and the channel line 59.

Under nominal conditions of can fill and lid thickness adjustment 55 is set to produce the same phototube output for either of the switch 53 positions. In some instances it will be sufficient to match the effects of the variation in lid thickness, the contents remaining constant, by correcting for the change in natural discrimination at different X-ray tube voltage. This is the purpose of gain adjustment 60 which may be set at minimum lid thickness expected to produce the same signal at line 61 as at line 56. Then as the lid thickness varied lines 56 and 61 would vary similarly. In general, it may be preferable to match the two plots of signal variation with lid thickness for the two switch positions in order to cancel out such lid variations. For this purpose non-linear networks 62 and 63 are inserted in the outputs. These may take on many forms, see for example page 315 and following Volume 19 of Radiation Laboratory Series, McGraw-Hill Book Company, first edition and will not be further described. By this means, the difference between signal on line 64 and on line 65 will then be a function of the variation in contents.

Stage 66 is an ordinary differential amplifier driving an output signal indicator 67 which can be calibrated to read deviation in contents from nominal. Additional functions and operators may be desired for different applications to yield the required results. While stage 66 is shown as an amplifier, those skilled in the art will readily recognize that differential stages having no amplifying function could also be used.

As an illustration, it may be required to measure instead or simultaneously the lid thickness, or in other examples to separate the function of thickness and composition (or alloy). The output signals 56 and 59 can be operated on to balance out the contents variation leaving the difference signal as the lid thickness variation; or intermodulating one signal on the other could produce different mathematical end products dependent on the situation.

Using X-rays, this property of different reaction to radiation can be enhanced by utilizing the characteristic radiation of either the X-ray tube target material or the specimen under test. As is well known at certain X-ray voltages (X-ray wavelength) many materials exhibit a radical change in the plot of penetrated signal vs. X-ray voltage. At these points the output signal would vary very markedly for changes in specific compositions and the sensitivity would be very great to slight changes.

From the foregoing, it will be apparent to those skilled in this art, that there is herein shown and described a new and useful invention which will have widespread application wherever non-contacting measurement of physical characteristics is important. While preferred embodiments have been illustrated and described, variations will be apparent, and applicant claims the benefit of a full range of equivalents within the scope of the appended claims.

I claim:

1. Apparatus for determining a physical characteristic of a test specimen comprising: means for alternately irradiating one side of the specimen with at least two radiations, having different absorption characteristics in the specimen; and means for measuring the different radiations after their transmission through the specimen.

2. Apparatus for determining a physical characteristic of a test specimen comprising: means for alternately irradiating one side of the specimen with at least two radiations having different absorption characteristics in the specimen; detecting means located on the opposite side of the specimen for detecting the transmitted radiation; and indicating means electrically connected to said detecting means.

3. Apparatus as defined by claim 2 in which said first mentioned means comprises at least two separate sources of different radiation.

4. Apparatus as defined by claim 2 in which said first mentioned means comprises an X-ray tube and means for cyclically varying the anode-cathode voltage between at least two values.

5. Apparatus as defined by claim 2 in which said detecting means comprises a photomultiplier tube.

6. Apparatus as defined by claim 2 in which said indicating means comprises at least two meters and means for switching the output of said detecting means to said meters, said switching means operating synchronously with said means for irradiating the specimen.

7. Apparatus as defined by claim 2 in which said indicating means comprises a differential stage having at least two channels and a meter connected to said stage to indicate the difference in output of the two channels.

8. Apparatus for measuring the moisture content and density of a paper web comprising in combination: an X-ray tube; energizing means for said tube including means for cyclically operating said tube at different anode voltages to produce cyclically, X-rays of different hardness; detecting means spaced from said tube and arranged to respond to radiation transmitted from said tube through the paper web; a pair of amplifiers; a pair of indicators, one connected to the output of each amplifier; and means for switching the output of said detecting means alternately to the inputs of said amplifiers in synchronous relation to the operation of said energizing means.

9. Apparatus for measuring the contents of sealed cans and eliminating the effects of can lid or bottom thickness variations comprising: an X-ray tube; energizing means for said tube including means for cyclically operating said tube at different anode voltages to produce cyclically, X-rays of different hardness; detecting means comprising a photomultiplier tube spaced from said X-ray tube and arranged to deliver an electrical output signal in response to radiation transmitted from said X-ray tube through the sealed can; a differential amplifier, including at least a pair of triodes; indicating means connected between the anodes of said triodes; means for coupling the output of said photomultiplier alternately cyclically to the grid cathode circuit of said triodes, said means operating synchronously with said energizing means of said X-ray tube.

References Cited in the file of this patent

UNITED STATES PATENTS

| | | |
|---|---|---|
| 2,503,075 | Smith | Apr. 4, 1950 |
| 2,732,503 | Jacobs | Jan. 24, 1956 |
| 2,884,535 | Swift | Apr. 28, 1959 |
| 2,897,371 | Hasler | July 28, 1959 |
| 2,920,206 | Heller | Jan. 5, 1960 |